United States Patent
Sarmah et al.

(10) Patent No.: US 8,903,434 B2
(45) Date of Patent: Dec. 2, 2014

(54) SYSTEM AND METHOD FOR MESSAGE-BASED CONVERSATIONS

(75) Inventors: Dilip Sarmah, Fremont, CA (US); Kim Hung Choy, Walnut Creek, CA (US); Raphael Hercules Sutton, Oakley, CA (US); Mark Andreas Theiding, Alameda, CA (US)

(73) Assignee: Sybase, Inc., Dublin, CA (US)

( * ) Notice: Subject to any disclaimer, the term of this patent is extended or adjusted under 35 U.S.C. 154(b) by 509 days.

(21) Appl. No.: 12/347,354

(22) Filed: Dec. 31, 2008

(65) Prior Publication Data

US 2010/0167764 A1    Jul. 1, 2010

(51) Int. Cl.
*H04W 4/00* (2009.01)
*H04W 4/12* (2009.01)
*H04L 12/58* (2006.01)

(52) U.S. Cl.
CPC ............ *H04W 4/12* (2013.01); *H04L 12/5885* (2013.01); *H04L 51/34* (2013.01)
USPC ............................ 455/466; 455/406; 455/410

(58) Field of Classification Search
CPC ...... H04W 4/12; H04L 51/34; H04L 12/5885
USPC ................ 455/466, 403, 406–408, 410, 411, 455/414.1–414.3, 412.1, 412.2, 455/414.1–414.4, 456.3; 370/342, 310, 370/312; 705/63–80, 1.1, 4, 5, 6, 14.1, 705/14.15–14.18, 14.21, 14.23, 14.26, 705/26.1–27.2, 35–45, 500; 326/56; 725/1, 725/5, 32–36, 56, 62, 86, 87, 90
See application file for complete search history.

(56) References Cited

U.S. PATENT DOCUMENTS

| | | |
|---|---|---|
| 5,604,343 A | 2/1997 | Curry et al. |
| 5,760,385 A | 6/1998 | Curry et al. |
| 5,805,702 A | 9/1998 | Curry et al. |
| 5,832,207 A | 11/1998 | Little et al. |
| 5,940,510 A | 8/1999 | Curry et al. |
| 5,949,880 A | 9/1999 | Curry et al. |
| 6,021,494 A | 2/2000 | Bolan et al. |
| 6,064,740 A | 5/2000 | Curiger et al. |
| 6,105,013 A | 8/2000 | Curry et al. |
| 6,219,789 B1 | 4/2001 | Little et al. |
| 6,237,095 B1 | 5/2001 | Curry et al. |
| 6,993,325 B1 | 1/2006 | Waesterlid |
| 7,114,175 B2 | 9/2006 | Lähteenmäki |
| 7,154,901 B2 | 12/2006 | Chava et al. |

(Continued)

OTHER PUBLICATIONS

Dictionary.com definition of "intermediary" printed on Jun. 16, 2014.*

(Continued)

*Primary Examiner* — Ronald Eisner
(74) *Attorney, Agent, or Firm* — Sterne, Kessler, Goldstein & Fox P.L.L.C.

(57) ABSTRACT

Leveraging the ubiquitous nature of wireless devices and the popularity of (Short Message Service, Multimedia Message Service, etc.) messaging, an infrastructure that supports message-based conversations (with for example the maintenance or preservation of state, context, etc. across or during the message exchanges) allowing users of wireless devices to employ their wireless devices to engage in and complete increasingly more complicated activities. The infrastructure may optionally leverage the capabilities of a centrally-located Messaging Inter-Carrier Vendor.

26 Claims, 7 Drawing Sheets

(56) References Cited

U.S. PATENT DOCUMENTS

| | | | |
|---|---|---|---|
| 7,343,496 B1 | 3/2008 | Hsiang et al. | |
| 7,530,099 B2 | 5/2009 | Flurry et al. | |
| 7,539,309 B2 | 5/2009 | Stadelmann et al. | |
| 7,568,222 B2 | 7/2009 | Randle et al. | |
| 7,606,560 B2 | 10/2009 | Labrou et al. | |
| 7,822,688 B2 | 10/2010 | Labrou et al. | |
| 7,945,240 B1* | 5/2011 | Klock et al. | 455/406 |
| 7,996,888 B2 | 8/2011 | Asunmaa et al. | |
| 8,010,783 B1 | 8/2011 | Cahill | |
| 8,019,362 B2 | 9/2011 | Sweatman et al. | |
| 8,028,329 B2 | 9/2011 | Whitcomb | |
| 8,380,989 B2 | 2/2013 | Sarmah et al. | |
| 8,539,225 B2 | 9/2013 | Guo et al. | |
| 8,640,203 B2 | 1/2014 | Shakkarwar | |
| 2003/0018918 A1 | 1/2003 | Natsuno et al. | |
| 2003/0028621 A1* | 2/2003 | Furlong et al. | 709/219 |
| 2003/0208697 A1 | 11/2003 | Gardner | |
| 2004/0006536 A1* | 1/2004 | Kawashima et al. | 705/39 |
| 2004/0049455 A1 | 3/2004 | Mohsenzadeh | |
| 2005/0033994 A1 | 2/2005 | Suzuki | |
| 2005/0220064 A1* | 10/2005 | Hundscheidt et al. | 370/342 |
| 2005/0246292 A1 | 11/2005 | Sarcanin | |
| 2006/0053296 A1 | 3/2006 | Busboom et al. | |
| 2006/0123079 A1* | 6/2006 | Sturniolo et al. | 709/203 |
| 2006/0165060 A1 | 7/2006 | Dua | |
| 2006/0259307 A1* | 11/2006 | Sanders et al. | 705/1 |
| 2007/0010242 A1* | 1/2007 | Blants et al. | 455/424 |
| 2007/0027775 A1 | 2/2007 | Hwang | |
| 2007/0033395 A1 | 2/2007 | MacLean | |
| 2007/0060127 A1* | 3/2007 | Forsberg | 455/436 |
| 2007/0174080 A1* | 7/2007 | Outwater | 705/1 |
| 2007/0220144 A1* | 9/2007 | Lovell | 709/224 |
| 2007/0220595 A1 | 9/2007 | M'raihi et al. | |
| 2007/0240202 A1 | 10/2007 | Sullivan et al. | |
| 2008/0085700 A1* | 4/2008 | Arora | 455/414.3 |
| 2008/0098464 A1* | 4/2008 | Mizrah | 726/5 |
| 2008/0178273 A1 | 7/2008 | Weber | |
| 2008/0207233 A1 | 8/2008 | Waytena et al. | |
| 2008/0222417 A1 | 9/2008 | Downes et al. | |
| 2008/0250035 A1* | 10/2008 | Smith et al. | 707/100 |
| 2008/0250477 A1 | 10/2008 | Samuelsson et al. | |
| 2008/0261634 A1* | 10/2008 | Viana et al. | 455/466 |
| 2008/0305815 A1* | 12/2008 | McDonough | 455/466 |
| 2008/0313707 A1 | 12/2008 | Jain | |
| 2009/0070861 A1 | 3/2009 | Jain | |
| 2009/0132813 A1 | 5/2009 | Schibuk | |
| 2009/0220075 A1 | 9/2009 | Sidhu | |
| 2009/0239534 A1* | 9/2009 | Jang et al. | 455/435.1 |
| 2009/0241175 A1 | 9/2009 | Trandal et al. | |
| 2009/0249497 A1 | 10/2009 | Fitzgerald et al. | |
| 2009/0265552 A1 | 10/2009 | Moshir et al. | |
| 2009/0276841 A1 | 11/2009 | Guo et al. | |
| 2010/0151823 A1 | 6/2010 | Dagorn et al. | |
| 2010/0167765 A1 | 7/2010 | Sarmah et al. | |
| 2010/0169947 A1 | 7/2010 | Sarmah et al. | |
| 2010/0229225 A1 | 9/2010 | Sarmah et al. | |
| 2010/0250350 A1 | 9/2010 | Lovell, Jr. | |
| 2013/0148806 A1 | 6/2013 | Sarmah et al. | |

OTHER PUBLICATIONS

Non-Final Rejection mailed Apr. 30, 2012 for U.S. Appl. No. 12/347,223, filed Dec. 31, 2008; 20 pages.
Final Rejection mailed Dec. 17, 2012 for U.S. Appl. No. 12/347,223, filed Dec. 31, 2008; 22 pages.
Non-Final Rejection mailed Jul. 17, 2013 for U.S. Appl. No. 12/347,223, filed Dec. 31, 2008; 22 pages.
Non-Final Rejection mailed Oct. 5, 2011 for U.S. Appl. No. 12/347,357, filed Dec. 31, 2008; 16 pages.
Final Rejection mailed May 1, 2012 for U.S. Appl. No. 12/347,357, filed Dec. 31, 2008; 18 pages.
Non-Final Rejection mailed Aug. 1, 2011 for U.S. Appl. No. 12/398,331, filed Mar. 5, 2009; 11 pages.
Non-Final Rejection mailed Jan. 10, 2012 for U.S. Appl. No. 12/398,331, filed Mar. 5, 2009; 22 pages.
Notice of Allowance mailed Oct. 12, 2012 for U.S. Appl. No. 12/398,331, filed Mar. 5, 2009; 7 pages.
U.S. Appl. No. 13/759,243, Sarmah et al., "System and Method for Second Factor Authentication," filed Feb. 5, 2013.
Non-Final Rejection mailed Oct. 21, 2013 for U.S. Appl. No. 13/759,243, filed Feb. 5, 2013; 12 pages.
Final Rejection mailed Jan. 2, 2014 for U.S. Appl. No. 12/347,223, filed Dec. 31, 2008; 33 pages.
Non-Final Rejection mailed May 23, 2014 for U.S. Appl. No. 12/347,357, filed Dec. 31, 2008, 17 pages.
Final Rejection mailed Jun. 5, 2014 for U.S. Appl. No. 13/759,243, filed Feb. 5, 2013, 14 pages.
Non-Final Rejection mailed Jun. 11, 2014 for U.S. Appl. No. 12/347,223, filed Dec. 31, 2008; 35 pages.

* cited by examiner

SYSTEM AND METHOD FOR MESSAGE-BASED CONVERSATIONS

CROSS-REFERENCE TO RELATED APPLICATIONS

The present application is related to concurrently-filed U.S. patent application Ser. No. 12/347,357, entitled SYSTEM AND METHOD FOR ENHANCED APPLICATION SERVER, which is incorporated herein by reference in its entirety.

The present application is related to concurrently-filed U.S. patent application Ser. No. 12/347,223, entitled SYSTEM AND METHOD FOR MOBILE USER AUTHENTICATION, which is incorporated herein by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), etc.

2. Background of the Invention

As the 'wireless revolution' continues to march forward the importance to a Mobile Subscriber (MS)—for example a user of a Wireless Device (WD) such as a cellular telephone, a BLACKBERRY, a Palm Pilot, etc. that is serviced by a Wireless Carrier (WC)—of their WD grows substantially.

One consequence of such a growing importance is the resulting ubiquitous nature of WDs—i.e., MSs carry them at almost all times and use them for an ever-increasing range of activities.

Coincident with the expanding presence of WDs has been the explosive growth of messaging—a steady annual increase, year over year, in the number of (SMS, MMS, etc.) messages that have been exchanged by and between WDs. That steady increase shows no sign of abating. For example, as reported by the industry group CTIA (see ctia.org on the World Wide Web [WWW]) in the U.S. there were over 158 billion SMS messages sent during 2006 (representing a 95% increase over 2005) and there were over 2.7 billion MMS messages sent during 2006 (representing a 100% increase over 2005).

Additionally, MSs would like to be able to use their WDs to engage in and complete increasingly more complicated activities (beyond, for example, exchanging simple messages with their friends, receiving one-way news/weather/financial/etc. notifications, etc.). Many of those activities require a coordinated exchange of multiple SMS, MMS, etc. messages—i.e., a (SMS, MMS, etc.) message-based conversation with possibly inter alia the maintenance or preservation of state, context, etc. across (i.e., during) the message exchanges. As just one illustrative example:

1) Mary, a hypothetical MS, might receive on her WD a message from one of her financial institutions informing her that one of her accounts has become overdrawn and asking her if she wishes to transfer money to the overdrawn account.

2) Mary might reply with 'Yes.'

3) Mary might receive a message from the financial institution listing her other accounts, their available balances, and asking her from which account she wishes to transfer the funds.

4) Mary might reply with '2' (indicating the second of the listed accounts).

5) Mary might receive a message from the financial institution asking her how much money she wishes to transfer.

6) Mary might reply with '100' (indicating $100).

7) Mary might receive a confirmation message from the financial institution.

The specific example that was described above is illustrative only and it will be readily apparent to one of ordinary skill in the relevant art that numerous other examples are easily possible and indeed are fully within the scope of the present invention.

Previous technologies (including for example monolithic systems such as mainframe computers and distributed systems such as client-server environments and n-tier environments) have addressed the maintenance or preservation of state, context, etc. across (i.e., during) individual exchanges through techniques such as session identifiers, Uniform Resource Locator (URL) rewriting, cookies, etc. However basic WD-based messaging paradigms such as SMS and MMS offer no such capabilities.

Given (1) the ubiquitous nature of WDs, (2) the popularity of (SMS, MMS, etc.) messaging, and (3) the need for MSs to use their WDs to engage in and complete increasingly more complicated activities, it would be desirable to enhance basic WD-based messaging through the innovatory support of (SMS, MMS, etc.) message-based conversations.

Aspects of the present invention facilitate such (SMS, MMS, etc.) message-based conversations in new, creative, and unconventional ways and address various of the not insubstantial challenges that are associated with same.

SUMMARY OF THE INVENTION

In one embodiment of the present invention there is provided a method for generating a (SMS, MMS, etc.) message containing at least one or more options, the options indicative of the current state of a (SMS, MMS, etc.) message-based conversation; sending the message to a WD of a MS; receiving from the WD of the MS a reply, the reply containing at least one of the options; performing at least one processing step on aspects of the reply, using at least in part information concerning the message-based conversation, yielding a next state of the (SMS, MMS, etc.) message-based conversation; and preserving at least the next state of the (SMS, MMS, etc.) message-based conversation in a repository.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

Throughout the drawings (a) like reference numbers generally indicate identical or functionally similar elements and (b) the left-most digit(s) of a reference number generally identify the drawing in which the reference number first appears. For example, in FIG. 4 reference numeral 318 would direct the reader to FIG. 3 for the first appearance of that element.

DETAILED DESCRIPTION

It should be noted that the embodiments that are described below are merely exemplary of the invention, which may be embodied in various forms. Therefore the details that are disclosed below are not to be interpreted as limiting but merely as the basis for possibly inter alia (a) teaching one of ordinary skill in the relevant art how to make and/or use the invention and (b) the claims.

The present invention may leverage the capabilities of a centrally-located, full-featured MICV facility. Reference is made to U.S. Pat. No. 7,154,901 entitled "Intermediary network system and method for facilitating message exchange between wireless networks," and its associated continuations, for a description of a MICV, a summary of various of the services/functions/etc. that are performed by a MICV, and a discussion of the numerous advantages that arise from same. U.S. Pat. No. 7,154,901 and its associated continuations are hereby incorporated by reference in their entirety.

Figure 1:
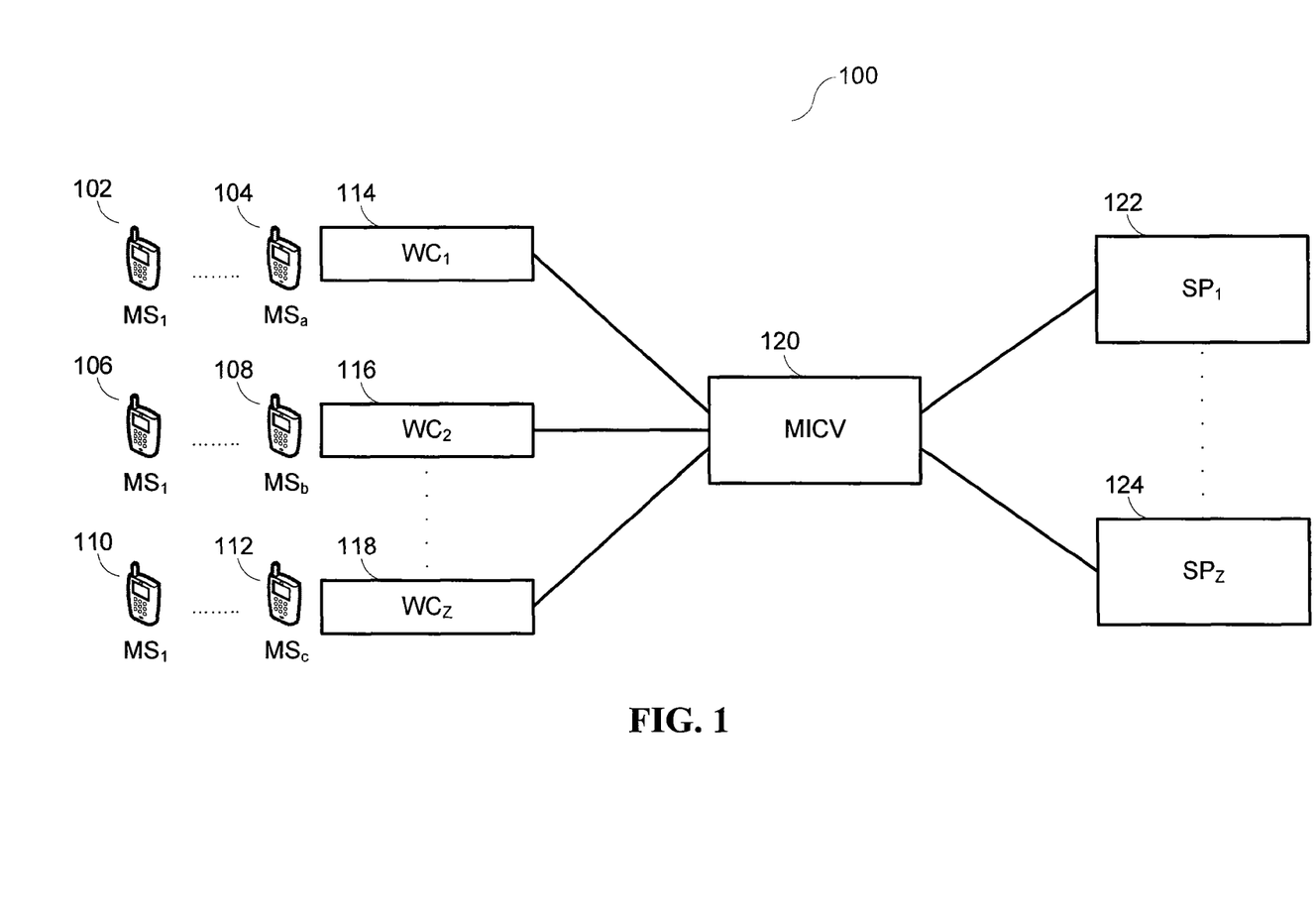
FIG. 1 is a diagrammatic presentation of an exemplary Messaging Inter-Carrier Vendor (MICV).

As illustrated in FIG. 1 and reference numeral 100 a MICV 120 is disposed between, possibly inter alia:

1) Multiple WCs ($WC_1$ 114, $WC_2$ 116→$WC_Z$ 118) on one side, and

2) Multiple SPs ($SP_1$ 122→$SP_Z$ 124), entities that may possibly inter alia provide a range of services/products/etc. to MSs, on the other side and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that other arrangements are equally applicable and indeed are fully within the scope of the present invention.

In the discussion below aspects of the present invention will be described and illustrated as being offered by a SP (i.e., as noted above an entity that may possibly inter alia provide a range of services/products/etc. to MSs). A SP may, for example, be realized as an independent service bureau, an element of or within some organization (such as possibly inter alia a financial institution, a retail establishment, an on-line retailer, etc.), an element of a WC or a landline carrier, an element of a MICV, multiple entities (such as for example those just listed) or aspects of same working together, etc.

For purposes of exposition in the discussion below aspects of the present invention will be described and illustrated as being offered by a SP working together with a Third Party (3P). A 3P may, for example, be a financial institution, a retail establishment, an on-line retailer, a utility company, an employer, etc. It will be readily apparent to one of ordinary skill in the relevant art that numerous other arrangements (e.g., all of the activities that are described below being supported just by a SP, all of the activities that are described below being supported just by a 3P, various of the activities that are described below being supported by one or more SPs working together with one or more 3Ps, etc.) are equally applicable and indeed are fully within the scope of the present invention.

In the discussion below reference will be made to messages that are sent, for example, between a MS and a SP. As set forth below, a given 'message' sent between a MS and a SP may actually comprise a series of steps in which the message is received, forwarded, and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP $SP_N$ offers a service that has been enhanced or augmented as provided through aspects of the instant invention and Mary, a MS, uses $SP_N$'s service.

Figure 2:
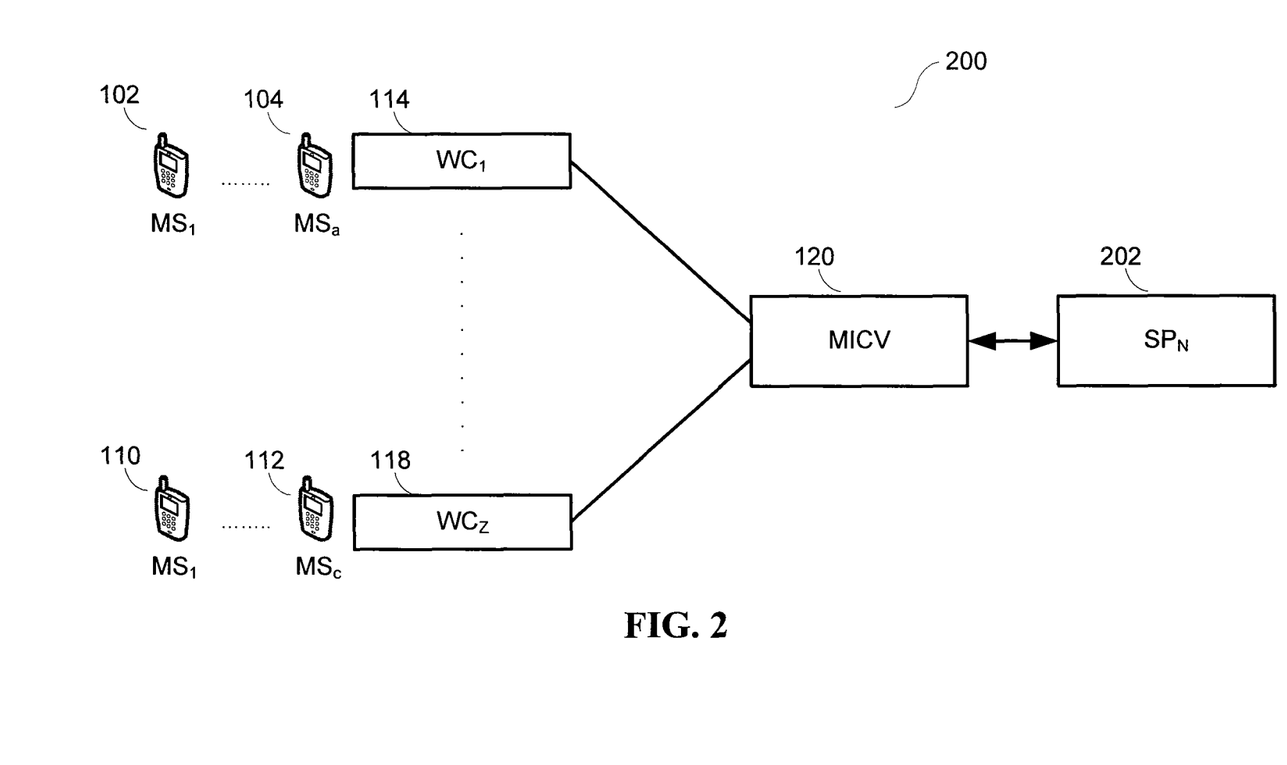
FIG. 2 illustrates one particular arrangement that is possible through aspects of the present invention.

FIG. 2 and reference numeral 200 depict one particular arrangement that may be possible under our hypothetical example. As indicated, all of the messaging traffic of numerous MSs ($MS_1$ 102→$MS_a$ 104 and $MS_1$ 110→$MS_c$ 112, including Mary), serviced by various WCs ($WC_1$ 114→$WC_Z$ 118), is exchanged with a MICV 120 and the MICV 120 is connected with $SP_N$ 202 (a SP that offers, possibly inter alia, aspects of the present invention).

Figure 3:
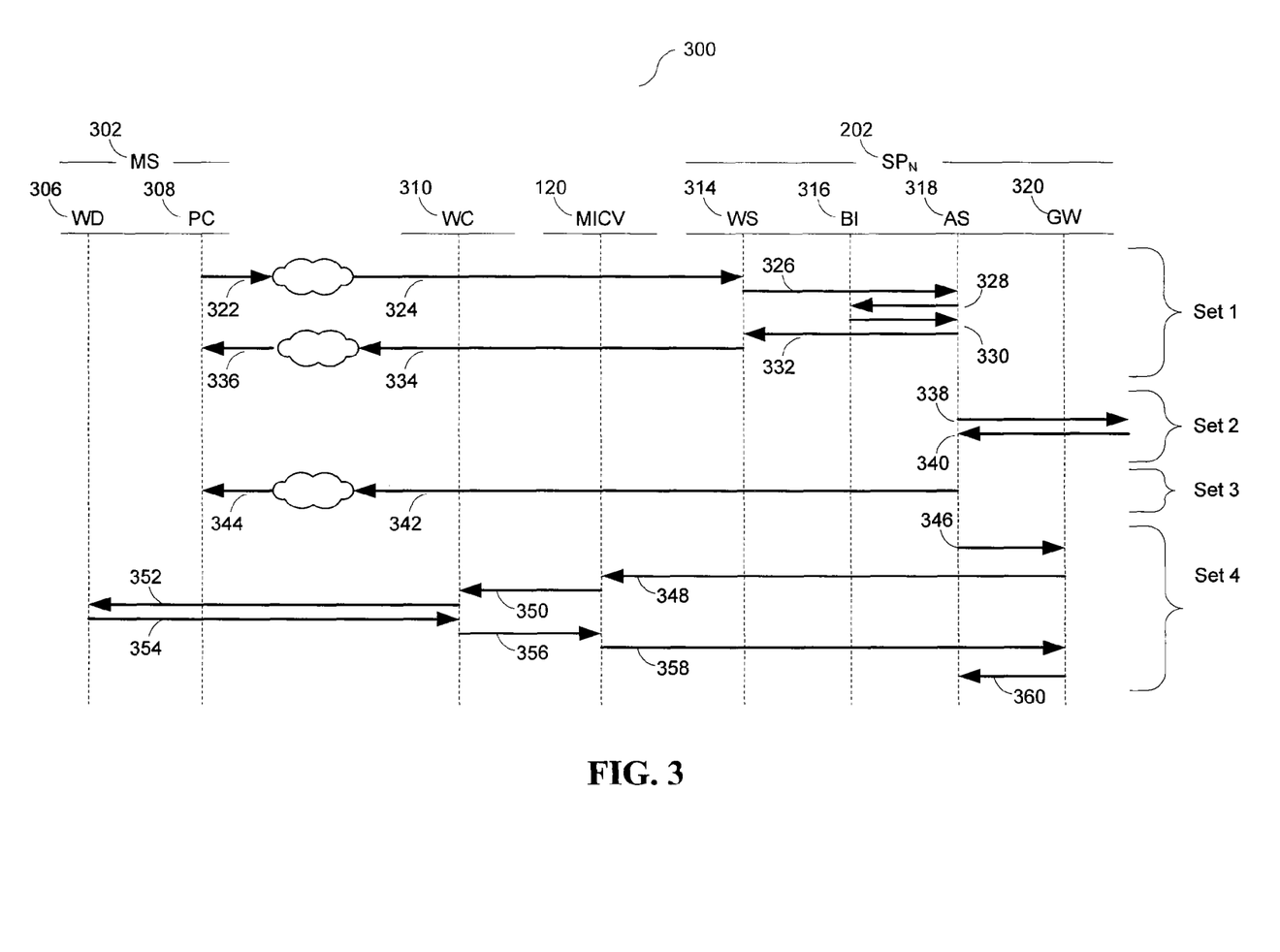
FIG. 3 illustrates various of the exchanges or interactions that are possible during an optional registration portion of the present invention.

FIG. 3 and reference numeral 300 illustrate various of the exchanges or interactions that might occur under an optional registration portion of our hypothetical example. Such a registration process may be tailored (e.g., the range of information gathered, the scope of services subsequently offered, etc.) to the class of user—e.g., possibly inter alia different types, categories, etc. of users may complete different registration processes. Additionally, a registration process may be supported or offered by any combination of one or more entities (e.g., a 3P such as a financial institution, a retail establishment, an on-line retailer, an employer, a utility company, etc.; a SP; etc.). As well, some or all of the information that is collected during a registration process may be shared or exchanged between any combination of one or more entities (e.g., a SP, a 3P, etc.). Thus a MS may complete a (required or optional) registration process with any number of entities and aspects of the information that is collected during a given registration process may be shared or exchanged between any number of entities. The registration process that is depicted through FIG. 3 is supported or offered by a SP (specifically by $SP_N$ 202).

Of interest and note in FIG. 3 are the following entities:

MS 302 WD 306. For example, a mobile telephone, BLACKBERRY, PalmPilot, etc. belonging to Mary 302.

MS 302 Personal Computer (PC) 308. For example, a home, work, etc. PC of Mary 302.

WC 310. The provider of service for a WD 306 of Mary 302.

MICV 120. As noted above the use of a MICV, although not required, provides significant advantages.

$SP_N$ 202 Web Server (WS) 314. A publicly-available WWW site that is optionally provided by $SP_N$ 202.

$SP_N$ 202 Billing Interface (BI) 316. A single, consolidated interface that $SP_N$ 202 may use to easily reach, possibly inter alia, one or more internal and/or external entities such as a credit card or debit card clearinghouse, a carrier billing system, a service bureau that provides access to multiple carrier billing systems, invoicing or billing facilities, etc.

$SP_N$ 202 AS 318. Facilities that provide key elements of the instant invention (which will be described below).

$SP_N$ 202 Gateway (GW) 320. A facility through which $SP_N$ 202 may exchange possibly inter alia (SMS, MMS, etc.) messages with possibly inter alia a MICV 120.

It is important to note that while in FIG. 3 the MS 302 WD 306 and MS 302 PC 308 entities are illustrated as being adjacent or otherwise near each other, in actual practice the entities may, for example, be physically located anywhere.

In FIG. 3 the exchanges that are collected under the designation Set 1 represent the activities that might take place as Mary 302 completes a registration process with $SP_N$ 202:

A) Mary 302 uses one of her PCs 308 to visit a WS 314 of $SP_N$ 202 to, possibly among other things, complete a service registration process (see 322→324).

B) A WS 314 of $SP_N$ 202 interacts with an AS 318 of $SP_N$ 202 to, possibly among other things, commit some or all of the information that Mary 302 provided to one or more data repositories (e.g., a databases), optionally initiate a billing transaction, etc. (see 326).

C) As appropriate and as required a BI 316 completes a billing transaction (see 328→330).

D) After receiving a response from an AS 318 of $SP_N$ 202 (332) a WS 314 of $SP_N$ 202 responds appropriately (e.g., with the presentation of a confirmation message, etc.) (see 334→336).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW, wireless messaging (SMS, MMS, etc.), Electronic Mail (E-Mail) messages, Instant Messaging (IM), conventional mail, telephone, an Interactive Voice Response (IVR) facility, etc.

During the registration process described above a range of information may be captured from a MS including, possibly inter alia:

A) Identifying Information. For example, possibly among other things, name, address, age, landline and wireless Telephone Numbers (TNs), E-Mail addresses, IM names/identifiers, a unique identifier and a password, etc.

B) Account Information. For example, possibly among other things, various of the particulars for one or more of a MS' accounts (with organizations such as, possibly inter alia, WWW sites, utility companies, financial institutions, on-line retailers, etc.). The particulars may include, possibly inter alia, organization name and contact details, account number, account access credentials, etc.

C) Billing Information. For example, the particulars (such as, possibly inter alia, name, account/routing/etc. numbers, etc.) for financial institution (bank, brokerage, etc.) accounts, credit cards, debit cards, etc. As well, possibly the selection of one or more of the different service billing models may be offered by a SP (including, inter alia, a fixed one-time charge, a recurring [monthly, etc.] fixed charge, a recurring [monthly, etc.] variable charge, a per-transaction charge, etc.) and possibly the selection of one or more of the different payment mechanisms that may be offered by a SP (including, possibly among other things, credit or debit card information, authorization to place a charge on a MS's phone bill, authorization to deduct funds from a MS' [bank, brokerage, etc.] account, etc.).

The specific pieces of information that were described above are illustrative only and it will be readily apparent to one of ordinary skill in the relevant art that numerous other pieces of information (e.g., additional Identifying Information, scheduled daily/weekly/etc. reporting desired and/or on-demand reporting desired, etc.) are easily possible and indeed are fully within the scope of the present invention.

As noted above the information that Mary provided during the registration process may be preserved in a data repository (e.g., a database) and may optionally be organized as a MS Profile.

The content of Mary's profile may be augmented by $SP_N$ 202 to include, as just a few examples of the many possibilities, internal and/or external demographic, psychographic, sociological, etc. data.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, inter alia:

1) The appearance of a line item charge on the bill or statement that a MS receives from her WC.

2) The charging of a credit card or the debiting of a debit card.

3) The (electronic, etc.) transfer of funds.

4) The generation of an invoice, statement, etc.

In FIG. 3 the exchanges that are collected under the designation Set 2 represent the activities that might take place as $SP_N$ 202 optionally coordinates, etc. with one or more external entities to, possibly among other things, secure access, exchange and/or confirm collected information, arrange to receive updates, etc. (see 338→340). During such exchanges $SP_N$ 202 may employ any combination of one or more of possibly inter alia an Application Programming Interface (API), an interface layer, an abstraction layer, communication protocols, etc.

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as an AS 318 of $SP_N$ 202 dispatches to Mary 302 one or more confirmation E-Mail messages (see 342→344).

The specific exchanges that were described above (as residing under the designation Set 3) are illustrative only and it will be readily apparent to one of ordinary skill in the relevant art that numerous other exchanges (including, inter alia, the dispatch of multiple E-mail messages [i.e., multiple instances of the sequence 342→344], the reply by Mary 302 to a received E-mail message, etc.) are easily possible and indeed are fully within the scope of the present invention.

In FIG. 3 the exchanges that are collected under the designation Set 4 represent the activities that might take place as an AS 318 of $SP_N$ 202 dispatches one or more confirmation SMS, MMS, etc. messages to a WD 306 of Mary 302 (346→352) and Mary 302 optionally replies or responds to the message(s) (354→360). Of interest and note are:

1) In the instant example the messages are shown traversing a MICV 120.

2) $SP_N$ 202 may employ a Short Code (SC) or a regular TN as its source address (and to which it would ask users of its service to direct any reply messages). While the abbreviated length of a SC (e.g., five digits for a SC administered by Neustar under the Common Short Code [CSC] program) incrementally enhances the experience of a MS 302 (e.g., Mary 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "Universal Short Code administration facility."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, possibly inter alia, aspects of the registration information that was described above may subsequently be managed (e.g., existing information may be edited or removed, new information may be added, etc.) through any combination of one or more channels including, inter alia, a WWW facility, wireless messaging (SMS, MMS, etc.), E-Mail messages, IM exchanges, conventional mail, telephone, IVR facilities, etc. Additionally, aspects of the registration information may be exchanged with one or more entities (such as possibly inter alia a 3P such as a financial institution, a retail establishment, an on-line retailer, an employer, a utility company, etc.; another SP; etc.).

To continue with our hypothetical example . . . as Mary goes about her daily activities there may arise numerous instances where she would like to employ her WD to possibly inter alia:

1) Determine the balance of one of her (bank, brokerage, credit card, etc.) accounts.

2) Complete the payment portion of a purchase (from, for example, an on-line retailer, etc.).

3) Transfer money between various of her (bank, brokerage, credit card, etc.) accounts, transfer money from one of her (bank, brokerage, credit card, etc.) accounts to someone else, transfer money to someone else (perhaps another MS) with the amount of the transfer (along with, for example, charges, fees, etc.) appearing on her WC statement, etc.

4) Receive notification of an account overdraft situation and be able to address the situation (through for example the infusion of funds to the overdrawn account).

5) Receive notification of a pending credit card, etc. transaction and be able to possibly inter alia accept or reject the transaction.

The specific examples that were cataloged above are illustrative only and it will be readily apparent to one of ordinary skill in the relevant art that numerous other examples are easily possible and indeed are fully within the scope of the present invention.

Figure 4:
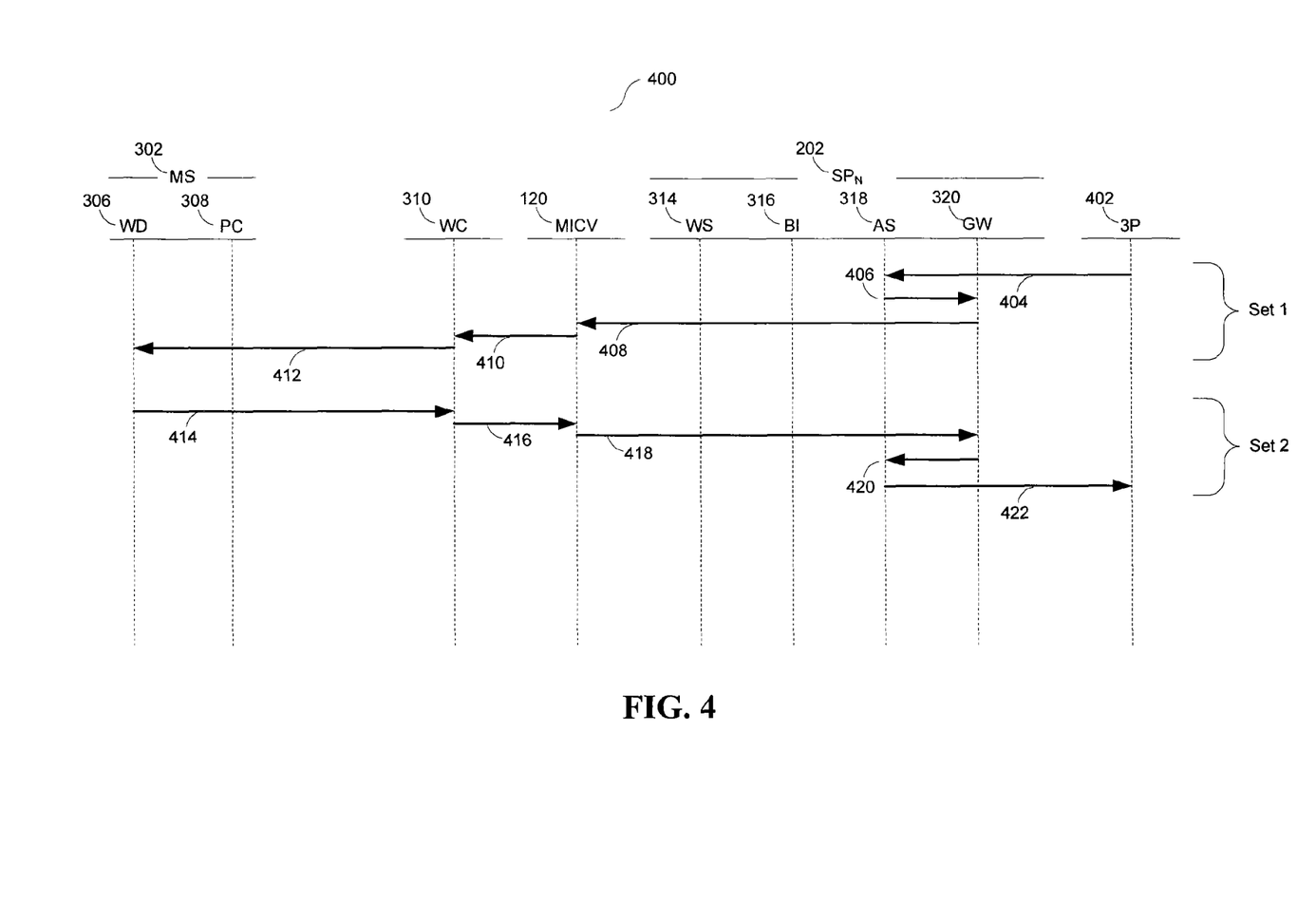
FIG. 4 illustrates various of the exchanges or interactions that are supported by aspects of the present invention.

FIG. 4 and reference numeral 400 provide a framework within which examples, such those cataloged above and others that would be readily apparent to one of ordinary skill in the relevant art, may be examined vis-à-vis aspects of the present invention. The entities that are depicted in FIG. 4 are the same as were depicted in, and described for, FIG. 3 with one exception:

Third Party (3P) 402. An organization such as, possibly inter alia, a financial institution, a retail establishment, an on-line retailer, an employer, a utility company, etc.

As noted previously, while the discussion below presents aspects of the present invention as being offered by a SP working together with a 3P it will be readily apparent to one of ordinary skill in the relevant art that numerous other arrangements (e.g., all of the activities that are described below being supported just by a SP, all of the activities that are described below being supported just by a 3P, various of the activities that are described below being supported by one or more SPs working together with one or more 3Ps, etc.) are equally applicable and indeed are fully within the scope of the present invention.

In FIG. 4 the exchanges that are collected under the designation Set 1 represent the activities that might take place as a 3P 402 initiates a (SMS, MMS, etc.) message-based conversation with Mary 302 by dispatching a request to an AS 318 of $SP_N$ 202 (see 404). Such a request may employ among other things any combination of one or more of possibly inter alia an API, RPCs, an interface layer, an abstraction layer, communication protocols, Extensible Markup Language (XML) documents, etc. and may include among other things information about Mary 302 (such as for example identifier, access credentials, the address [e.g., TN] of her WD 306, etc.), various particulars of the desired (SMS, MMS, etc.) message-based conversation, etc.

AS 318 may complete a range of internal processing activities (described in detail below) including possibly inter alia validating any supplied information, determining various of the particulars for the desired (SMS, MMS, etc.) message-based conversation, etc. During its processing activities AS 318 may among other things possibly leverage:

1) One or more repositories containing information about Mary 302 (e.g., as previously collected during a registration process, as previously received from one or more external entities [such as 3P 402], etc.).

2) A body of dynamically updateable configuration information or data (for among other things the different types of supported [SMS, MMS, etc.] message-based conversations, etc.).

3) Bodies of flexible, extensible, and dynamically configurable logic or rules (governing among other things the operation of a [SMS, MMS, etc.] message-based conversation, etc.).

SMS, MMS, etc. message requests may be directed to a GW 320 of $SP_N$ 202 (see 406) where one or more (SMS, MMS, etc.) messages, containing possibly inter alia aspects of the (SMS, MMS, etc.) message-based conversation (e.g., perhaps a question or an alert followed by one or more reply options), may be dispatched to a WD 306 of Mary 302 (see 408→412).

The specific exchanges that were described above (as residing under the designation Set 1) are illustrative only and it will be readily apparent to one of ordinary skill in the relevant art that numerous other exchanges are easily possible and indeed are fully within the scope of the present invention. For example:

1) While the example that was presented above illustrated a system-initiated (SMS, MMS, etc.) message-based conversation (through the dispatch by a system of one or more Mobile Terminated [MT] messages to a WD) it is also possible to have a user-initiated (SMS, MMS, etc.) message-based conversation (through the dispatch by a user of a WD of one or more Mobile Originated [MO] messages to a system).

2) $SP_N$ 202 may obtain the address (e.g., the TN) of the WD 306 of Mary 302 through any number of means including, for example, from 3P 402 (as described above), from one or more repositories within $SP_N$ 202 (possibly leveraging registration information that was provided by Mary 302 and which was supplied to $SP_N$ 202 either directly or indirectly), etc.

3) In any dispatched notification messages $SP_N$ 202 may employ any number of addresses (including, possibly inter alia, a SC, a TN, etc.) to which it would ask users to direct any reply messages.

4) $SP_N$ 202 may optionally alert 3P 402 (and/or one or more other entities) to the generation and the dispatch of one or more (SMS, MMS, etc.) messages.

5) Dispatched (SMS, MMS, etc.) messages may optionally contain, possibly inter alia, descriptive or explanatory text, confirmation information, contact information, a request to call (e.g., a help center) at a particular TN, etc.

In FIG. 4 the exchanges that are collected under the designation Set 2 represent the activities that might take place as Mary 302 replies to a received SMS, MMS, etc. message (see 414→422).

The specific exchanges that were described above (as residing under the designation Set 2) are illustrative only and it will be readily apparent to one of ordinary skill in the relevant art that numerous other exchanges are easily possible and indeed are fully within the scope of the present invention. For example:

1) Based on any received replies from Mary 302 $SP_N$ 202 may optionally complete one or more additional processing steps.

2) The sequence 404→412 and 414→422 may be repeated any number of times.

The Set 1 and Set 2 exchanges that were described above are illustrative only and it will be readily apparent to one of ordinary skill in the relevant art that numerous other exchanges are easily possible and indeed are fully within the scope of the present invention. For example:

1) A MS may optionally need to acknowledge a SMS, MMS, etc. message (by, for example, replying to same) within a defined period of time (after which an unacknowledged message may, possibly inter alia, go 'stale' and not be usable).

2) A particular (SMS, MMS, etc.) message-based conversation reply value may optionally be designated as being single-use, multi-use, etc.

3) A SP may incorporate additional factors, criteria, tests, etc. during various of its processing activities including possibly inter alia MS Location-Based Service (LBS) and/or Global Positioning System (GPS) information, biometric information, etc.

4) During its different activities an SP may complete any number of billing, reporting, etc. transactions.

5) An SP may track a MS' usage, aggregate same, optionally offer (to the MS, to external entities such as a 3P, etc.) discounts, rebates, surcharges, etc. based on the tracked usage, etc.

6) During its processing steps an AS may employ any combination of a number of automated (e.g., through software solutions) and/or manual (e.g., through human intervention) actions, techniques, capabilities, etc. and each of the techniques, strategies, capabilities, etc. that were described above may have associated with it, possibly inter alia, an optional set of weighting, scoring, confidence, etc. factors that may be used, either individually or together, to develop results.

The catalog of processing steps, activities, etc. that was described above is illustrative only and it will be readily apparent to one of ordinary skill in the relevant art that numerous other processing steps, activities, etc. are easily possible and indeed are fully within the scope of the present invention.

As described above, during a (SMS, MMS, etc.) message-based conversation a SP's AS may possibly inter alia maintain context or state across or during numerous (SMS, MMS, etc.) message exchanges. It is important to note that:

1) An AS may employ a key during a (SMS, MMS, etc.) message-based conversation. Such a key may for example be the TN of a MS' WD, be a dynamically generated value that an AS may associate with a MS' WD, etc. and may be explicitly or implicitly included in various of the SMS, MMS, etc. messages.

2) While an individual (SMS, MMS, etc.) message-based conversation may be synchronous (i.e., the conversation does not advance until a MS replies to a received SMS, MMS, etc. message) there may be multiple simultaneous conversations open or ongoing at any given time.

3) An AS may realize a (SMS, MMS, etc.) message-based conversation through a flexible, extensible, and dynamically configurable Finite State Machine (FSM). For example:

A) A particular state of a FSM may define possibly inter alia a specific step of a (SMS, MMS, etc.) message-based conversation and may contain, possibly among other things, text for questions, alerts, etc.; available replies; etc.

B) At any given state (or condition) of a FSM a particular input may result in among other things a transition to a new state with possibly inter alia a range of actions (e.g., updates to repositories; exchanges with external entities; one or more SMS, MMS, etc. messages; etc.).

C) Multiple inputs may be defined for any given state, with each input possibly leading to one or more different (new) states.

D) A range of flexible, extensible, and dynamically configurable reply edit, validation, analysis, confirmation, etc. rules may be defined for, or attached to, any given state.

4) An AS may encapsulate the particulars of a FSM through a plug-in paradigm or architecture allowing for, possibly inter alia, the quick installation of new plug-ins (FSMs).

To help illustrate the material that was just discussed consider the following hypothetical. Imagine that the TN of Mary's WD is 7035551212 and that three different (SMS, MMS, etc.) message-based conversations are open or underway. Under the first conversation a message to Mary (concerning an account overdraft situation) might identify three accounts—ACT11 #50000, ACT12 #50001, and ACT13 #50003—from which Mary may transfer funds. Under the second conversation a message to Mary (concerning a bill payment) might identify two accounts—ACT21 #50001 and ACT22 #50003—from which Mary may draw the necessary funds. Under the third conversation a message to Mary (concerning the authorization of a credit card transaction) might identify two possible replies—Y3 for Yes and N3 for No.

Mary might reply to the message that is connected with the second conversation with ACT22 and then reply to the message that is connected with the first conversation with ACT11 and then reply to the message that is connected with the third conversation with N3. While all three message exchanges may be keyed to 7035551212 (the TN of Mary's WD) the coding or the structure of the reply values (ACT22, ACT11, N3) allow the system to among other things associate a reply to its conversation (ACT22←→the second conversation, ACT11←→the first conversation, N3←→the third conversation) and, for example, support asynchronous or out-of-sequence exchanges.

It is to be understood that the example that was described above is illustrative only and it will be readily apparent to one of ordinary skill in the relevant art that numerous other identification and tracking models, paradigms, etc. are easily possible and indeed are fully within the scope of the present invention.

The confirmation, response, etc. message(s) that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS, GPS, etc. facility).

The confirmation, response, etc. message(s) that were identified above may optionally contain advertising—e.g., textual material if an SMS model is being utilized, or multimedia (images of brand logos, sound, video snippets, etc.) material if an MMS model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS, GPS, etc. facility).

The confirmation, response, etc. message(s) that were identified above may optionally contain promotional materials (e.g., still images, video clips, etc.).

Figure 5:
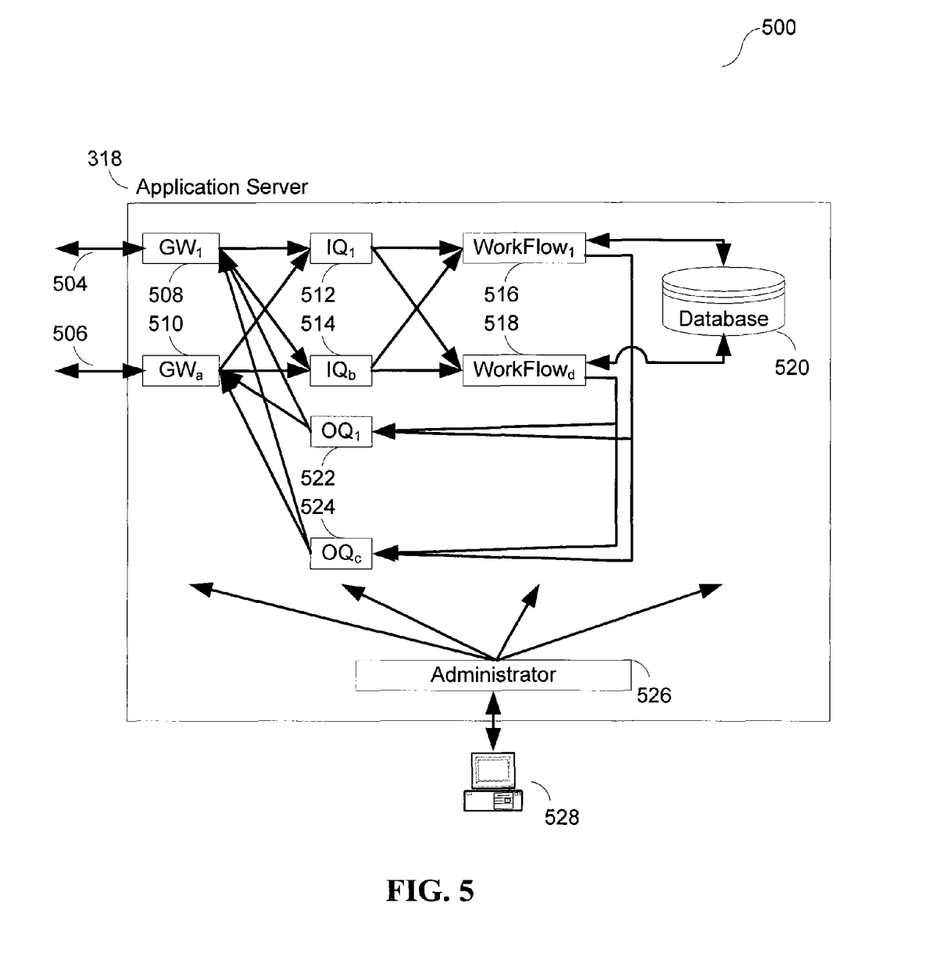
FIG. 5 is a diagrammatic presentation of aspects of an exemplary Service Provider (SP) Application Server (AS).

FIG. 5 and reference numeral 500 provides a diagrammatic presentation of aspects of an exemplary SP AS 318. The illustrated AS 318 contains several key components—Gateways ($GW_1$ 508→$GW_a$ 510 in the diagram), Incoming Queues ($IQ_1$ 512→$IQ_b$ 514 in the diagram), WorkFlows (WorkFlow$_1$ 516→WorkFlow$_d$ 518 in the diagram), Database 520, Outgoing Queues ($OQ_1$ 522→$OQ_c$ 524 in the diagram), and an Administrator 526. It will be readily apparent to one of ordinary skill in the relevant art that numerous other components are possible within an AS 318.

A dynamically updateable set of one or more Gateways ($GW_1$ 508→$GW_a$ 510 in the diagram) handle incoming (SMS/MMS/etc. messaging, etc.) traffic 504→506 and outgoing (SMS/MMS/etc. messaging, etc.) traffic 504→506. A GW may support the receipt of incoming traffic 504→506 and the dispatch of outgoing traffic 504→506 via any combination of one or more of the available public and/or proprietary messaging paradigms including possibly inter alia Short Message Peer-to-Peer (SMPP), Computer Interface to Message Distribution (CIMD), External Machine Interface (EMI)/Universal Computer Protocol (UCP), Signaling System Seven (SS7) Mobile Application Part (MAP), MM4, MM7, etc.

Incoming traffic 504→506 is accepted and deposited on an intermediate or temporary Incoming Queue ($IQ_1$ 512→$IQ_b$ 514 in the diagram) for subsequent processing. Processed artifacts are removed from an intermediate or temporary Outgoing Queue ($OQ_1$ 522→$OQ_c$ 524 in the diagram) and then dispatched 504→506.

A dynamically updateable set of one or more Incoming Queues ($IQ_1$ 512→$IQ_b$ 514 in the diagram) and a dynamically updateable set of one or more Outgoing Queues ($OQ_1$ 522→$OQ_1$ 524 in the diagram) operate as intermediate or temporary buffers for incoming 504→506 and outgoing traffic 504→506.

A dynamically updateable set of one or more WorkFlows (WorkFlow$_1$ 516→WorkFlow$_d$ 518 in the diagram) possibly inter alia remove incoming traffic 504→506 from an intermediate or temporary Incoming Queue ($IQ_1$ 512→$IQ_b$ 514 in the diagram), perform all of the required processing operations, and deposit processed artifacts on an intermediate or temporary Outgoing Queue ($OQ_1$ 522→$OQ_c$ 524 in the diagram). The WorkFlow component will be described more fully below.

The Database 520 that is depicted in FIG. 5 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 526 that is depicted in FIG. 5 provides management or administrative control over all of the different components of an AS 318 through, as one example, a WWW-based interface 528. It will be readily apparent to one of ordinary skill in the relevant art that numerous other interfaces (e.g., a data feed, an API, etc.) are easily possible.

Through flexible, extensible, and dynamically updatable configuration information a WorkFlow component may be quickly and easily realized to support any number of activities. For example, WorkFlows might be configured to support a registration process; to support interactions with external entities; to support various internal processing steps (as described above) including, possibly inter alia, (1) the evaluation of received request messages, (2) the generation, preservation, etc. of (SMS, MMS, etc.) message-based conversation particulars (e.g., question or alert text, available replies, etc.) and (3) the generation and dispatch of response messages; to support the generation and dispatch of confirmation, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

Figure 6:
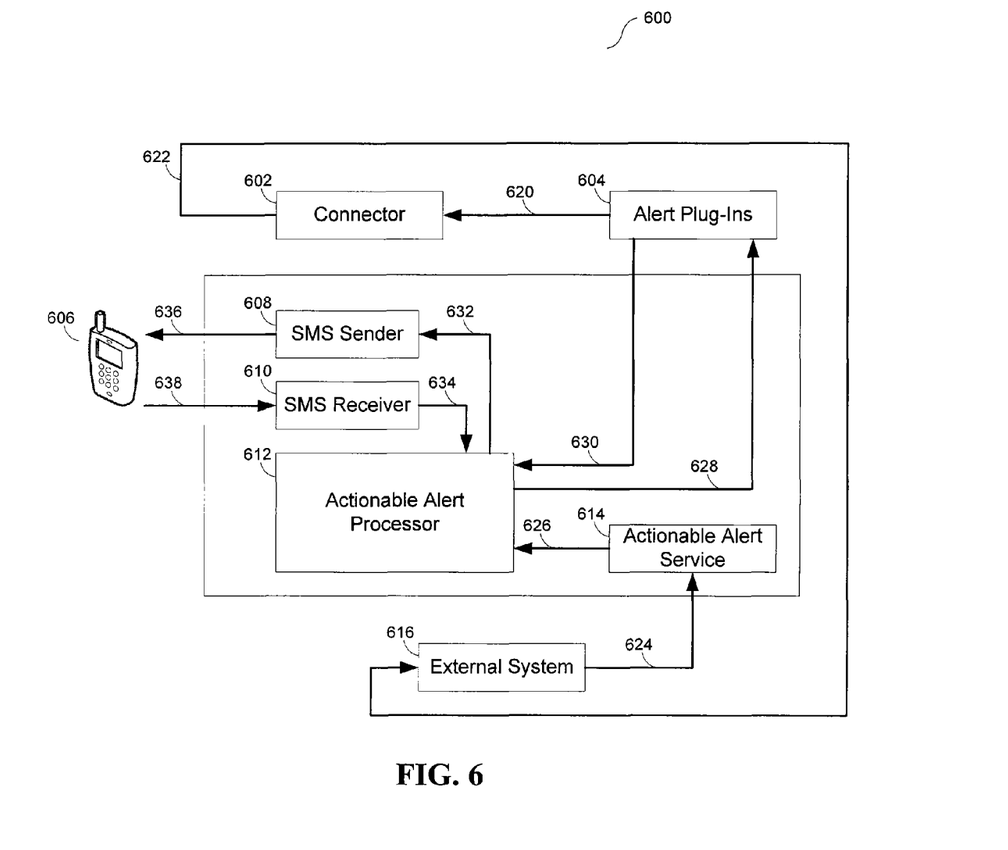
FIG. 6 depicts an illustrative alerting system that is possible under aspects of the present invention.

FIG. 6 depicts an alerting system 600 that employs SMS message-based conversations which that may be realized through aspects of the present invention. An external system 616 (such as for example a financial institution, etc.) may dispatch an alert notification (see 624, e.g., an account is overdrawn, a defined threshold has been exceeded, etc.) to an actionable alert service 614 which among other things may contain core logic for handling different types of alerts.

After completing various processing activities an actionable alert service 614 may notify (see 626) an actionable alert processor 612 which may, among other things, based on alert type, etc. pass various alert details (see 628) on to an appropriate plug-in 604.

A plug-in 604 may complete a range of internal, possibly alert-specific, processing activities (which may leverage among other things flexible, extensible, and dynamically configurable definitional information) to for example initialize or update a FSM, define the universe of acceptable replies to issued SMS messages, etc. A plug-in 604 may for each SMS message that is generated direct the message to an SMS sender 608 (see 630→632) which may, among other things, dispatch the message to the intended MS' WD 606 (see 636). A plug-in 604 may optionally update an external system 616 to various of its activities (see 620→622 involving possibly an external system-specific connector 602).

An SMS receiver 610 may collect replies (see 638) from the MS' WD 606 and among other things pass them along to an actionable alert processor 612 (see 634) for processing at same and possibly inter alia dispatch to an appropriate plug-in 604 (see 628) for among other things validation and processing (e.g., to advance the state of an FSM, etc.).

By isolating the details of the organization, operation, etc. of an SMS message-based conversation to a plug-in 604 the functionality of the depicted SMS-based alerting system 600 may quickly and easily be extended to for example encompass new SMS message-based conversations.

Figure 7:
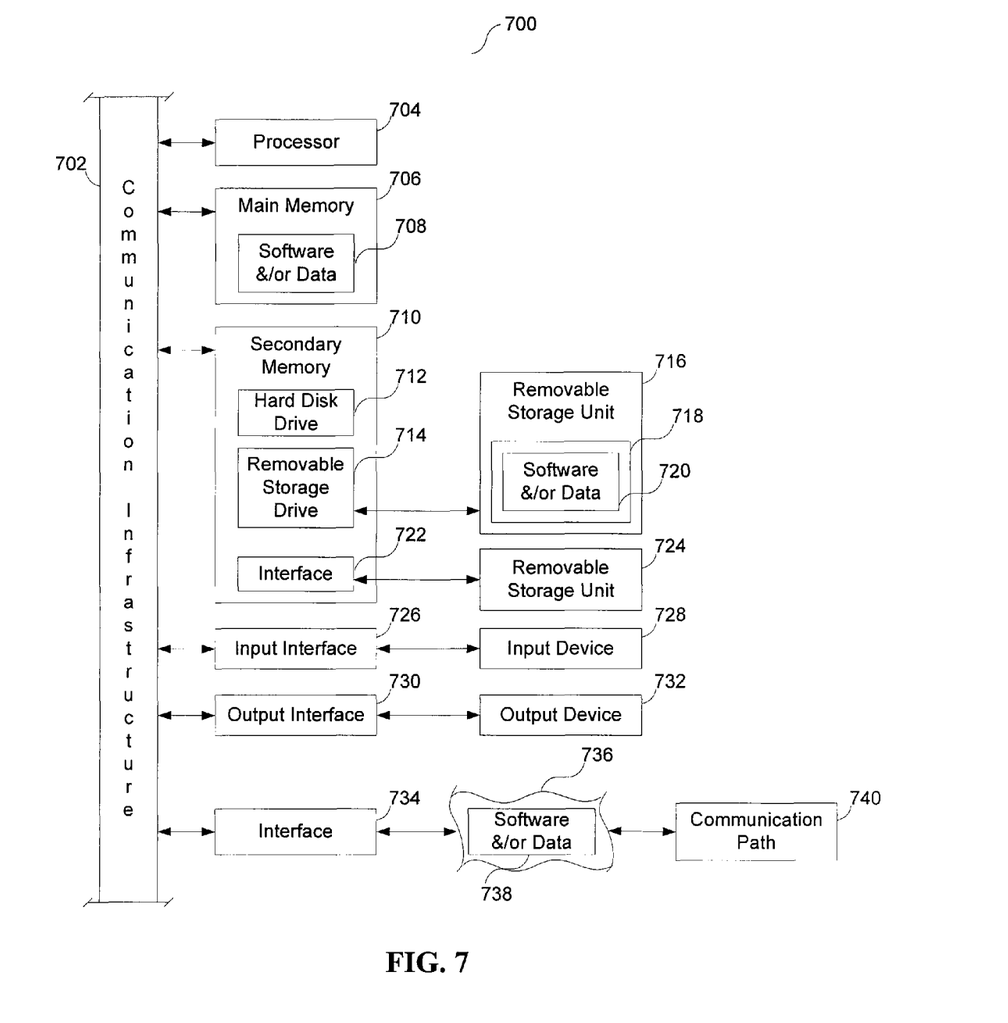
FIG. 7 depicts an example computer system through which embodiments of aspects of the present invention may be implemented.

Various aspects of the present invention can be implemented by software, firmware, hardware, or any combination thereof. FIG. 7 illustrates an example computer system 700 in which the present invention, or portions thereof, (such as described above under paragraphs 47→84, paragraphs 92→130, paragraphs 134→144, and paragraphs 145→149) can be implemented as computer-readable code. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose processor or a general purpose processor. Processor 704 is connected to a communication infrastructure 702 (for example, a bus or a network).

Computer system 700 also includes a main memory 706, preferably Random Access Memory (RAM), containing possibly inter alia computer software and/or data 708.

Computer system 700 may also include a secondary memory 710. Secondary memory 710 may include, for example, a hard disk drive 712, a removable storage drive 714, a memory stick, etc. A removable storage drive 714 may comprise a floppy disk drive, a magnetic tape drive, an optical disk drive, a flash memory, or the like. A removable storage drive 714 reads from and/or writes to a removable storage unit 716 in a well known manner. A removable storage unit 716 may comprise a floppy disk, magnetic tape, optical disk, etc. which is read by and written to by removable storage drive 714. As will be appreciated by persons skilled in the relevant art(s) removable storage unit 716 includes a computer usable storage medium 718 having stored therein possibly inter alia computer software and/or data 720.

In alternative implementations, secondary memory 710 may include other similar means for allowing computer programs or other instructions to be loaded into computer system 700. Such means may include, for example, a removable storage unit 724 and an interface 722. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 724 and interfaces 722 which allow software and data to be transferred from the removable storage unit 724 to computer system 700.

Computer system 700 may also include an input interface 726 and a range of input devices 728 such as, possibly inter alia, a keyboard, a mouse, etc.

Computer system 700 may also include an output interface 730 and a range of output devices 732 such as, possibly inter alia, a display, one or more speakers, etc.

Computer system 700 may also include a communications interface 734. Communications interface 734 allows software and/or data 738 to be transferred between computer system 700 and external devices. Communications interface 734 may include a modem, a network interface (such as an Ethernet card), a communications port, a Personal Computer Memory Card International Association (PCMCIA) slot and card, or the like. Software and/or data 738 transferred via communications interface 734 are in the form of signals 736 which may be electronic, electromagnetic, optical, or other signals capable of being received by communications interface 734. These signals 736 are provided to communications interface 734 via a communications path 740. Communications path 740 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 716, removable storage unit 724, and a hard disk installed in hard disk drive 712. Signals carried over communications path 740 can also embody the logic described herein. Computer program medium and computer usable medium can also refer to memories, such as main memory 706 and secondary memory 710, which can be memory semiconductors (e.g. Dynamic Random Access Memory [DRAM] elements, etc.). These computer program products are means for providing software to computer system 700.

Computer programs (also called computer control logic) are stored in main memory 706 and/or secondary memory 710. Computer programs may also be received via communications interface 734. Such computer programs, when executed, enable computer system 700 to implement the present invention as discussed herein. In particular, the computer programs, when executed, enable processor 704 to implement the processes of aspects of the present invention, such as the steps discussed above under paragraphs 47→84, paragraphs 92→130, paragraphs 134→144, and paragraphs 145→149. Accordingly, such computer programs represent controllers of the computer system 700. Where the invention is implemented using software, the software may be stored in a computer program product and loaded into computer system 700 using removable storage drive 714, interface 722, hard drive 712 or communications interface 734.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

It is important to note that while aspects of the discussion that was presented above referenced the use of SCs and TNs it will be readily apparent to one of ordinary skill in the relevant art that other address identifiers (such as, for example, Session Initiation Protocol [SIP] Address, URL, etc.) are equally applicable and, indeed, are fully within the scope of the present invention.

The discussion that was just presented referenced two specific wireless messaging paradigms—SMS and MMS. Those paradigms potentially offer an incremental advantage over other paradigms in that native support for SMS and/or MMS is commonly found on a WD that a potential MS would be carrying. However, it is to be understood that it would be readily apparent to one of ordinary skill in the relevant art that numerous other paradigms (such as, for example, Internet Protocol [IP] Multimedia Subsystem [IMS], IM, E-Mail, Wireless Application Protocol [WAP], etc.) are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following acronyms are employed in this disclosure:

| Acronym | Meaning |
| --- | --- |
| API | Application Programming Interface |
| AS | Application Server |
| BI | Billing Interface |
| CD-ROM | Compact Disc Read-Only Memory |
| CIMD | Computer Interface to Message Distribution |
| CSC | Common Short Code |
| DBMS | Database Management System |
| DRAM | Dynamic Random Access Memory |
| E-Mail | Electronic Mail |
| EMI | External Machine Interface |
| EPROM | Erasable Programmable Read-Only Memory |
| FSM | Finite State Machine |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IVR | Interactive Voice Response |
| LBS | Location-Based Service |
| MAP | Mobile Application Part |
| MEMS | Microelectromechanical Systems |
| MICV | Messaging Inter-Carrier Vendor |
| MMS | Multimedia Message Service |
| MO | Mobile Originated |
| MS | Mobile Subscriber |
| MT | Mobile Terminated |
| ODBMS | Object Database Management System |
| OQ | Outgoing Queue |
| PC | Personal Computer |
| PCMCIA | Personal Computer Memory Card International Association |
| PROM | Programmable Read-Only Memory |
| RAM | Random Access Memory |
| RDBMS | Relational Database Management System |
| RF | Radio Frequency |
| SC | Short Code |
| SFA | Second Factor Authentication |
| SIP | Session Initiation Protocol |
| SMPP | Short Message Peer-to-Peer |
| SMS | Short Message Service |
| SP | Service Provider |
| SS7 | Signaling System Seven |
| 3P | Third Party |
| TN | Telephone Number |
| UCP | Universal Computer Protocol |
| URL | Uniform Resource Locator |
| WAP | Wireless Application Protocol |
| WC | Wireless Carrier |
| WD | Wireless Device |
| WF | Work Flow |
| WS | Web Server |
| WWW | World-Wide Web |
| XML | Extensible Markup Language |

What is claimed is:

1. A method for conducting a stateful, message-based conversation involving a Wireless Device (WD) of a Mobile Subscriber (MS), the method comprising:
    receiving, at an intermediary device, a first request from a service provider to initiate a first message-based conversation between the service provider and the MS, wherein the first request includes information relating to a first set of accounts of the MS;

upon receiving the first request, validating, by the intermediary device, the information relating to the first set of accounts of the MS to advance the first request;

upon validating the information relating to the first account of the MS, generating, by the intermediary device, a message containing one or more selectable options, wherein the one or more selectable options are generated based on a current state of the first message-based conversation, and wherein the first message-based conversation occurs in a first secure, authenticated session where the MS uses the WD to participate in a first financial transaction with a financial institution;

sending, by the intermediary device, the generated message containing the one or more selectable options to the WD of the MS;

receiving, by the intermediary device, a reply from the WD of the MS, in response to the generated message, the reply comprising at least one selected option of the one or more selectable options;

performing, by the intermediary device, one or more processing steps to initiate a monetary transaction, based on the at least one selected option received from the WD of the MS, using at least in part: information contained in the first message-based conversation, or MS information collected as part of a registration process;

determining, by the intermediary device, a next state of the first message-based conversation based on performing the one or more processing steps;

storing, by the intermediary device, at least the determined next state of the first message-based conversation; and receiving, by the intermediary device from the MS, a second request to initiate a second message-based conversation between the service provider and the MS, wherein the second request includes information relating to a second set of accounts of the MS, wherein the second message-based conversation occurs in a second secure, authenticated session while the first message-based conversation is in progress, and wherein the first set of accounts and the second set of accounts have at least one account in common.

2. The method of claim 1, wherein the message and the reply each comprise one of a Short Message Service (SMS) message and a Multimedia Message Service (MMS) message.

3. The method of claim 1, wherein the one or more selectable options are encoded in a fashion unique to the message-based conversation.

4. The method of claim 1, wherein the MS information collected as part of the registration process comprises at least one of identifying information, account information, and billing information.

5. The method of claim 1, wherein the registration process generates a MS profile.

6. The method of claim 1, wherein the registration process is web-based.

7. The method of claim 1, wherein the registration process includes a billing component.

8. The method of claim 1, wherein the registration process generates one or more confirmation messages.

9. The method of claim 8, wherein the one or more confirmation messages each comprise one of a SMS message and MMS message.

10. The method of claim 1, wherein the reply must be received within a time period.

11. The method of claim 1, wherein the message-based conversation is implemented as a finite state machine.

12. The method of claim 1, wherein the message-based conversation employs a key.

13. The method of claim 12, wherein the key is a telephone number associated with the WD.

14. The method of claim 1, wherein the at least one or more processing steps includes completing a billing transaction.

15. The method of claim 1, wherein the at least one or more processing steps incorporates information about a physical location of the WD.

16. A method for conducting a stateful, message-based conversation involving a Wireless Device (WD) of a Mobile Subscriber (MS) and a third-party participant, the method comprising:

receiving a first request from a service provider, at an intermediary device, to initiate a first message-based conversation between the service provider and the MS, wherein the first request includes information relating to a first set of accounts of the MS;

upon receiving the first request, validating, by the intermediary device, the information relating to the first set of accounts of the MS to advance the first request;

upon validating the information relating to the first account of the MS, generating, by the intermediary device, a message comprising one or more selectable options, wherein the one or more selectable options are generated based on a current state of the first message-based conversation, and wherein the first message-based conversation occurs in a first secure, authenticated session where the MS uses the WD to participate in a first financial transaction with a financial institution;

sending, by the intermediary device, the generated message containing the one or more selectable options to the WD of the MS;

receiving, by the intermediary device, a reply from the WD of the MS in response to the generated message, the reply comprising at least one selected option of the one or more selectable options;

performing, by the intermediary device, one or more processing steps to initiate a monetary transaction, based on the at least one selected option received from the WD of the MS, using at least in part: information contained in the first message-based conversation, or MS information collected as part of a registration process;

updating, by the intermediary device, the third-party; and receiving, by the intermediary device from the MS, a second request to initiate a second message-based conversation between the service provider and the MS, wherein the second request includes information relating to a second set of accounts of the MS, wherein the second message-based conversation occurs in a second secure, authenticated session while the first message-based conversation is in progress, and wherein the first set of accounts and the second set of accounts have at least one account in common.

17. The method of claim 16, wherein the message and the reply each comprise one of a SMS message and MMS message.

18. The method of claim 16, wherein the one or more selectable options are encoded in a fashion tailored to the MS participating in the message-based conversation.

19. The method of claim 16, wherein the reply message must be received within a predetermined time period.

20. A system for conducting a stateful, message-based conversation involving a Wireless Device (WD) of a Mobile Subscriber (MS), comprising:

an alert module configured to receive a first request from a service provider to initiate a first message-based conversation between the service provider and the MS, wherein the first request includes information relating to a first set of accounts of the MS;

a validation module configured to validate, upon receiving the first request, the information relating to the first set of accounts of the MS to advance the first request;

a message generator configured to create, upon validating the information relating to the first account of the MS, a message containing one or more selectable options based on a current state of the first message-based conversation, wherein the first message-based conversation occurs in a first secure, authenticated session where the MS uses the WD to participate in a first financial transaction with a financial institution;

a message communicator configured to send the generated message containing the one or more selectable options to the WD of the MS;

a message receiver configured to receive a reply from the WD of the MS, in response to the generated message, the reply comprising at least one selected option of the one or more selectable options; and a message-based conversation processor configured to:

perform one or more processing steps to initiate a monetary transaction, based on the at least one selected option received from the WD of the MS, using information contained in the first message-based conversation, or MS information collected as part of a registration process, determine a next state of the first message-based conversation store at least the determined next state of the first message-based conversation; and receiving, from the MS, a second request to initiate a second message-based conversation between the service provider and the MS, wherein the second request includes information relating to a second set of accounts of the MS, wherein the second message-based conversation occurs in a second secure, authenticated session while the first message-based conversation is in progress, and wherein the first set of accounts and the second set of accounts have at least one account in common.

21. A computer readable storage device having control logic recorded thereon that when executed by a processor, causes the processor to perform operations to conduct a stateful, message-based conversation involving a Wireless Device (WD) of a Mobile Subscriber (MS), the operations comprising:

receiving a first request, at an intermediary device, from a service provider, to initiate a first message-based conversation between the service provider and the MS, wherein the first request includes information relating to a first set of accounts of the MS;

upon receiving the first request, validating, by the intermediary device, the information relating to the first set of accounts of the MS to advance the first request;

upon validating the information relating to the first account of the MS, creating a message containing one or more selectable options based on a current state of the first message-based conversation, wherein the first message-based conversation occurs in first a secure, authenticated session where the MS uses the WD to participate in a first financial transaction with a financial institution;

sending, by the intermediary device, the generated message containing the one or more selectable options to WD of MS;

receiving, by the intermediary device, a reply from the WD of the MS, in response to the generated message, the reply comprising at least one selected option of the one or more selectable options;

performing, by the intermediary device, one or more processing steps to initiate a monetary transaction, based on the at least one selected option received from the WD of the MS, using at least in part:

information contained in the first message-based conversation, or

MS information collected as part of a registration process;

determining, by the intermediary device, a next state of the message-based conversation based on performing the one or more processing steps;

storing, by the intermediary device, at least the determined next state of the message-based conversation; and receiving, by the intermediary device from the MS, a second request to initiate a second message-based conversation between the service provider and the MS, wherein the second request includes information relating to a second set of accounts of the MS, wherein the second message-based conversation occurs in a second secure, authenticated session while the first message-based conversation is in progress, and wherein the first set of accounts and the second set of accounts have at least one account in common.

22. The method of claim 1, wherein the information relating to the MS contains at least one of an identifier, access credentials, and an address of the WD.

23. The method of claim 1, wherein the intermediary device comprises a messaging inter-carrier vendor (MICV).

24. The method of claim 1, wherein determining the next state occurs during a plurality of message exchanges.

25. The method of claim 24, wherein the plurality of message exchanges are out of sequence exchanges.

26. The method of claim 24, wherein the plurality of message exchanges are asynchronous exchanges.

* * * * *